E. A. LEAVITT.
CHECK BOOK.
APPLICATION FILED JUNE 1, 1915.
1,211,324. Patented Jan. 2, 1917.
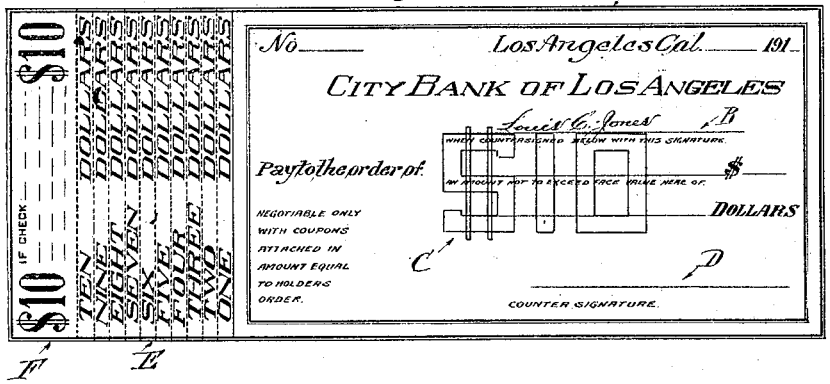
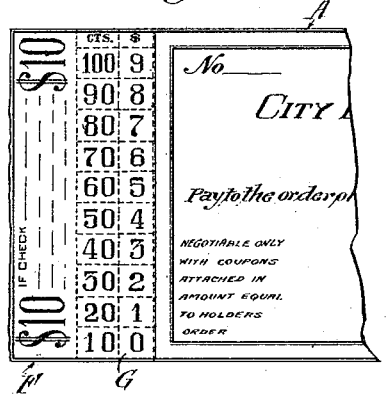
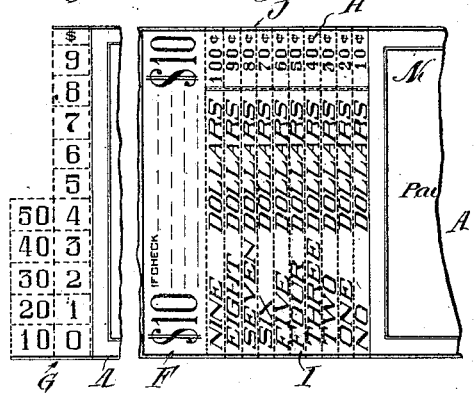
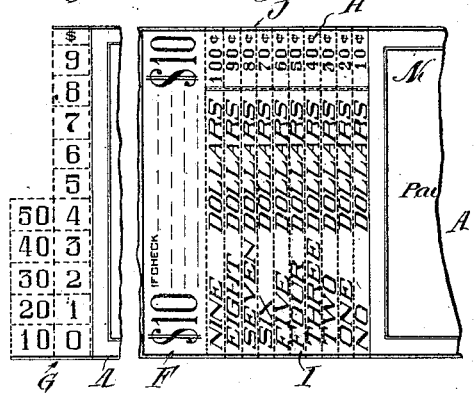
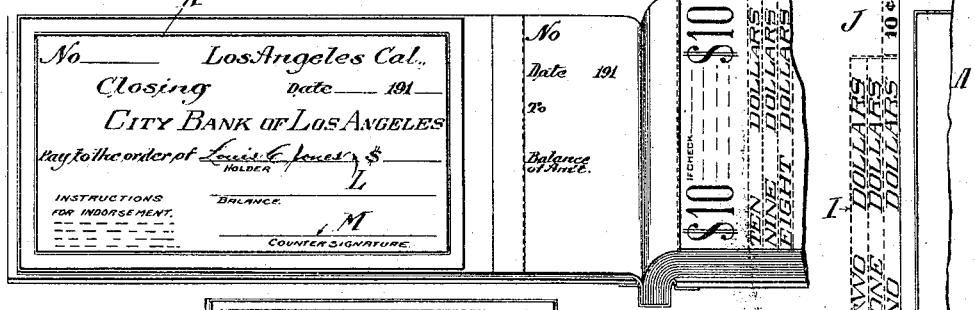
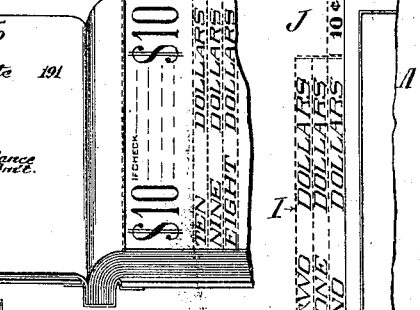
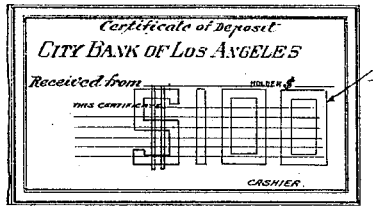

UNITED STATES PATENT OFFICE.

ELGIN A. LEAVITT, OF LOS ANGELES, CALIFORNIA.

CHECK-BOOK.

1,211,324.   Specification of Letters Patent.   Patented Jan. 2, 1917.

Application filed June 1, 1915. Serial No. 31,601.

*To all whom it may concern:*

Be it known that I, ELGIN A. LEAVITT, a citizen of the United States, residing at Los Angeles, in the county of Los Angeles and State of California, have invented a new and useful Check-Book, of which the following is a specification.

My invention relates to check books.

The ordinary form of check as issued against a bank account is not readily negotiable except upon proper identification of the party presenting same. This is due to the fact that such a check if uncertified is no evidence that the drawer of the check has money in the bank. Ordinary checks are therefore of little value to persons traveling through territory where they are unknown, and various forms of checks and check books have been devised to overcome this objection.

A common form of check is that known as the American Bankers' Association check, which is issued in convenient denominations, a number of these checks being bound in a single book. These checks are purchased at a slight advance over their face value, and are signed by the purchaser. Such checks are readily accepted without identification, the purchaser countersigning same, his counter-signature being sufficient identification if it compares exactly with the signature appearing in the body of the check. The American Bankers' Association check, and similar checks, are in general use, and are a convenient substitute for currency being negotiable only by the purchaser of the check and therefore in a measure protecting the purchaser against loss by theft. They are open to the objection, however, that they must be drawn for a fixed amount even though the user has no immediate use for the whole amount. This is objectionable in that it is often impossible to get them cashed for this amount, especially when they are in large denominations.

The principal object of my invention is to provide a certificate of deposit check which is limited to a fixed maximum amount, but which may be drawn for a lesser amount should the purchaser of the check desire to do so. As these checks are readily negotiable and as they often pass to parties unknown to the purchaser of the check it is very desirable that the amount for which the check is drawn be absolutely fixed, so that there is no possibility of any subsequent holder of the check raising the amount for which it was drawn by erasures, or changes on the body of the check.

A further object of my invention is to provide a check having a maximum limit indicated on the face thereof, and a limiting portion which may be torn off to indicate a lesser amount. As the total amount for which the checks are issued is a fixed one it is evident that if the checks are drawn for a smaller amount than the maximum limit there will remain a balance on some, or all, of the checks, so that the purchaser of the check book will still have a balance due him from the bank of issue after all the checks have been used.

A further object of my invention is to provide a stub which remains in the check book after the check is detached. This stub indicates the balance, this balance being the difference between the maximum limit of the check and the amount for which the check was drawn.

When the check book is originally issued it is to all intents and purposes a certificate of deposit and in the practical working of my invention I prefer to embody a certificate of deposit in the check book with the checks. This certificate of deposit indicates the total amount of all the checks in the book. When all or a portion of these checks have been issued for smaller amounts than their maximum limit there will remain a balance due the purchaser of the book, and it is a further object of my invention to provide on the back of the certificate of deposit a closing check which may be drawn for an amount equal to the balance due the purchaser of the book, and which when presented with the stubs and properly filled out and indorsed will be cashed by the bank of issue. This closing check will then serve to balance the certificate of deposit, and when torn out will indicate that the certificate of ing my invention is illustrated.

Further objects and advantages will be evident to bankers, or those skilled in the banking art.

In the drawings one form of book embodying my invention is illustrated:—

Figure 1 is a face of a preferred form of check with its stub and limiting portion attached, a number of these checks of similar, or different denominations being bound up in a check book. Fig. 2 illustrates a different form of limiting portion. Fig. 3 illustrates a second alternative form of limiting portion. Fig. 4 shows the back of the certificate of deposit with the closing check, and a record stub for same, the closing check being illustrated as being bound up in the book with a number of checks similar to that shown in Fig. 1. Fig. 5 illustrates a preferred form of certificate of deposit. Fig. 6 illustrates the appearance of the end of the check shown in Fig. 2 after it is detached. Fig. 7 illustrates the appearance of the check illustrated in Fig. 3 after it is detached.

In these drawings a check A is provided having a space for the signature B, and having plainly indicated thereon a maximum limit C, a space also being provided for the countersignature D. The maximum limit C may be indicated by large numerals, or may be perforated, embossed, or otherwise indicated. This maximum limit C is the amount for which the check is purchased, and is the greatest amount for which the check can be drawn. Suitable instructions are given on the face of the check making it evident that the amount for which the check is drawn cannot exceed this maximum limit. The check is attached to a limiting portion E. This limiting portion, as shown in Fig. 1, consists of small stubs numbered from one dollar to ten dollars, the limiting portion E terminating in a stub F which is bound up in the check book, and which has the maximum limit of the check indicated plainly thereon.

In the form of my invention illustrated in Fig. 2, the check A is exactly similar to the check illustrated in Fig. 1, and the stub F is exactly similar to the stub illustrated in Fig. 1, the limiting portion G consisting of two columns, one indicating dollars and the other cents. This check may be torn off as indicated in Fig. 6, so that it can be drawn not only for an even number of dollars, but also for a number of dollars and any even number of dimes.

In the form of my invention illustrated in Fig. 3 a check having similar characteristics is shown. In this check the limiting portion H consists of two series of strips, one I indicating dollars, and one portion J indicating cents. This may be torn off as illustrated in Fig. 7 to illustrate a number of dollars and any number of even dimes. The closing check K can be of any convenient form and should have a signature L, and a space for counter-signature M. In a similar manner the certificate of deposit illustrated in Fig. 5 may be of any convenient form, its only peculiarity being that it has an unmistakable indication N of the total amount for which the check book was originally issued.

The method of operation of this invention is as follows: The check books being made up in any convenient amounts are purchased for a given sum of money and the certificate of deposit N covering this amount of money, and being unmistakable indication that the purchaser of the book has a deposit equaling that amount. The presentation of the certificate of deposit together with the check book is therefore an unmistakable indication that the purchaser has money on deposit and that the checks are good. Whenever the purchaser of the book desires to cash a check, or to tender it in payment for merchandise he fills out the check for an amount equal to, or less than the maximum limit of the check as indicated at C. If the form of check indicated in Fig. 1 is used the amount for which the check is made out must be even dollars, but by using the form of checks illustrated in Figs. 2, or 3, even dollars and even dimes may be indicated. In practice the form shown in Fig. 1 answers practically all requirements and is preferred. It can, of course, be made for other amounts than ten dollars, this amount being simply shown for illustrative purposes.

The purchaser of the check fills in the amount for which he desires to draw the check, inserts the name of the party to whose order the check is to be paid, and countersigns it in the presence of that party, the identity of the counter-signature with his original signature already on the check serving to positively identify him as the original purchaser of the book. The check is then detached so that the limiting portion E indicates the amount for which the check is drawn, this limiting portion then serving to protect the purchaser of the book against subsequent alterations of the check to increase the amount thereof. The stub of the check with the remainder of the limiting portions serves to indicate at all times the amount for which the check was drawn, and therefore the balance of the certificate of deposit remaining to the credit of the purchaser of the check. After the checks have been drawn they may pass from bank to bank like an ordinary check.

Whenever the checks have all been used, or earlier if desired, the purchaser of the check book can withdraw any balance due him as evidenced by the condition of his check book, by simply filling in the closing check K and presenting it, this check when detached serving to cancel the certificate of deposit which is printed on the back thereof.

It is evident that by the general use of check books embodying my invention the issuance of fictitious checks would be largely prevented, the check book itself being an evidence that the holder thereof has funds to his credit in the bank. The use of such check books will also prevent it being necessary for a person to carry any considerable amount of currency or other money in their possession, it being possible to negotiate checks embodying my invention quite as readily as any form of money now in general use. By the use of the limiting portions E, G, C, and I, or by the use of similar limiting portions the alteration of the check after its issue would be very largely prevented.

I claim as my invention:

1. A check book comprising a certificate of deposit, and a series of checks bound therewith each of said checks having a maximum limit indicated thereon, the sum of the limits of all the checks equaling the amount of the certificate of deposit, and each check having a detachable limit portion which may be torn off to indicate an amount equal to or less than the maximum limit of that check, the stub from which the check is torn being left in the book to indicate the amount for which the check was drawn, or to indicate the difference between the amount for which the check was drawn and the maximum limit of the check; the certificate of deposit having a closing check printed thereon which when properly filled out will be cashed by the bank of issue for an amount equal to the face value of the certificate of deposit less the checks drawn against same as evidenced by said stubs.

2. A check book comprising a certificate of deposit, a series of checks, means on each check for indicating a maximum limit for which the check may be drawn, the sum of the limits of the checks being equal to the amount of the certificate of deposit, and means for binding said certificate of deposit and said checks together to form a book.

3. A check book comprising a certificate of deposit, a series of checks, means on each check for indicating a maximum limit for which the check may be drawn, the sum of the limits of the checks being equal to the amount of the certificate of deposit, a stub for each check to which said check is initially attached, means on said stub for indicating the amount for which the check was drawn, and means for binding said stubs and said certificate of deposit together to form a book.

4. A check book comprising a certificate of deposit, a series of checks, means on each check for indicating a maximum limit for which the check may be drawn, the sum of the limits of the checks being equal to the amount of the certificate of deposit, a closing check, and means for binding said certificate of deposit, said series of checks, and said closing check together to form a book.

5. A check book comprising a certificate of deposit, a series of checks, means on each check for indicating a maximum limit for which the check may be drawn, the sum of the limits of the checks being equal to the amount of the certificate of deposit, a stub for each check to which said check is initially attached, means on said stub for indicating the amount for which the check was drawn, a closing check, and means for binding said certificate of deposit, said stubs and said closing check together to form a book.

In testimony whereof, I have hereunto set my hand at Los Angeles, California, this 24th day of May, 1915.

ELGIN A. LEAVITT.

Copies of this patent may be obtained for five cents each, by addressing the "Commissioner of Patents, Washington, D. C."